(12) United States Patent
Zhang et al.

(10) Patent No.: US 7,936,538 B1
(45) Date of Patent: May 3, 2011

(54) CONTROLLED FLY HEIGHT SLIDER WITH NECKED ABS

(75) Inventors: Shuyu Zhang, Fremont, CA (US); Francis Crimi, Los Altos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 556 days.

(21) Appl. No.: 11/539,372

(22) Filed: Oct. 6, 2006

Related U.S. Application Data

(60) Provisional application No. 60/724,416, filed on Oct. 7, 2005.

(51) Int. Cl.
*G11B 21/21* (2006.01)
*G11B 5/60* (2006.01)

(52) U.S. Cl. .................................. 360/236.1; 360/235.7
(58) Field of Classification Search ............... 360/236.3, 360/235.4, 235.6, 236.1, 236.2, 236.5, 236.6, 360/236.8, 236.9, 237, 234.3, 235.7, 235.8
See application file for complete search history.

(56) References Cited

U.S. PATENT DOCUMENTS

| | | | | |
|---|---|---|---|---|
| 5,774,304 A | * | 6/1998 | Crane et al. ................. | 360/236.9 |
| 5,796,550 A | * | 8/1998 | O'Sullivan et al. ......... | 360/236.8 |
| 5,910,865 A | * | 6/1999 | Wang et al. ................. | 360/235.7 |
| 5,991,113 A | | 11/1999 | Meyer et al. | |
| 6,195,219 B1 | | 2/2001 | Smith | |
| 6,292,332 B1 | * | 9/2001 | Peng .......................... | 360/236.8 |
| 6,999,265 B1 | | 2/2006 | Schreck et al. | |
| 7,092,193 B1 | | 8/2006 | McKenzie et al. | |
| 2002/0114108 A1 | | 8/2002 | Bement et al. | |
| 2002/0191326 A1 | * | 12/2002 | Xu et al. ........................ | 360/75 |
| 2003/0123191 A1 | * | 7/2003 | Kasamatsu et al. ........ | 360/235.8 |
| 2003/0174430 A1 | | 9/2003 | Takahashi et al. | |
| 2004/0150916 A1 | * | 8/2004 | Rao et al. ................... | 360/235.8 |
| 2006/0023358 A1 | * | 2/2006 | Huang ........................ | 360/235.6 |
| 2006/0082927 A1 | * | 4/2006 | Hanyu ........................ | 360/235.8 |

OTHER PUBLICATIONS

U.S. Appl. No. 10/859,917, filed Jun. 3, 2004; Name of Applicant of cited document Yan et al.

* cited by examiner

*Primary Examiner* — Craig A. Renner
*Assistant Examiner* — Tamara Ashford
(74) *Attorney, Agent, or Firm* — Westman, Champlin & Kelly, P.A.

(57) ABSTRACT

A slider that includes a necked ABS pad is disclosed. More specifically, the slider includes an ABS pad having a first ABS region and a second ABS region, where the second ABS region is disposed immediately in front of the first ABS region proceeding in the direction of a leading edge of the slider. A transducer and a thermal actuator each may be disposed within the first ABS region. The width of the second ABS region (a necked portion of the ABS pad) is less than a width of the first ABS region.

17 Claims, 11 Drawing Sheets

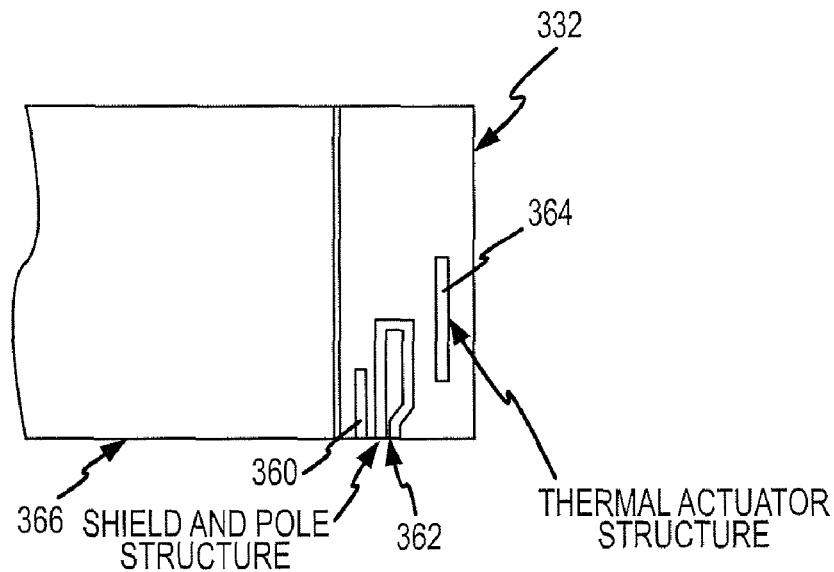
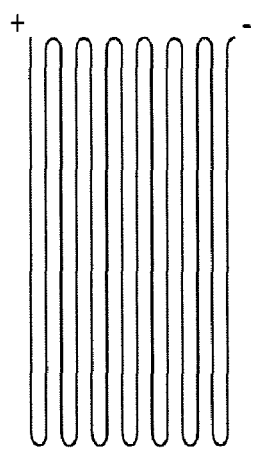
FIG.7B
FIG.7C
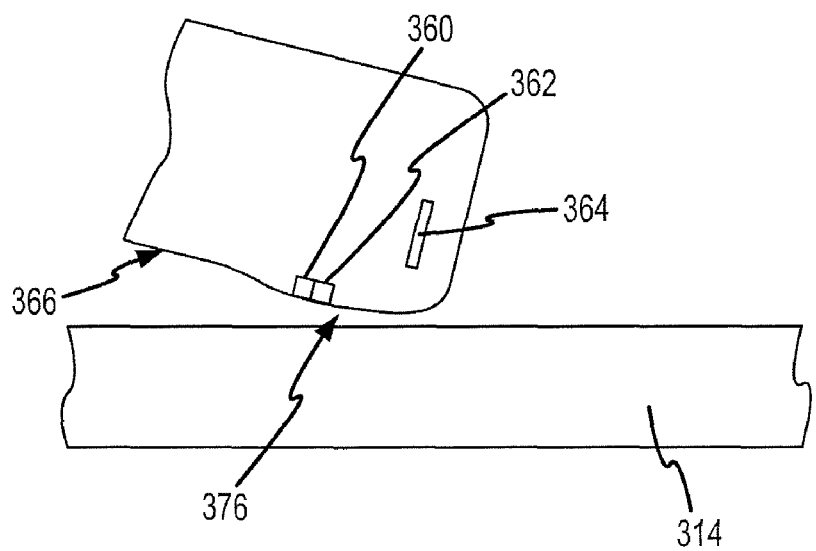
FIG.7D

CONTROLLED FLY HEIGHT SLIDER WITH NECKED ABS

CROSS-REFERENCE TO RELATED APPLICATIONS

This patent application claims priority under 35 U.S.C. §119(e) to U.S. Provisional Patent Application Ser. No. 60/724,416, that was filed on Oct. 7, 2005, that is entitled "NECKED CENTRAL ABS FOR HIGHER FLYING HEIGHT ADJUST EFFICIENCY," and the entire disclosure of which is hereby incorporated by reference in its entirety herein.

FIELD OF THE INVENTION

The present invention generally relates to sliders that may be used by disk drives and, more particularly, to the configuration of an air bearing surface incorporated on the lower surface or bottom of the slider.

BACKGROUND OF THE INVENTION

One way to characterize the manner in which information is recorded to and/or read from a date storage medium (e.g., a disk) is the manner in which the head interfaces with the disk. Contact recording has at least been proposed to place the head and disk in direct physical contact when exchanging signals therebetween. Theoretically this maximizes the performance of the head and disk at least in relation to reading information from and writing information to the disk. Certain issues at least potentially exist in relation to contact recording systems. Constant contact between the head and disk may present both wear and contamination (e.g., through generation of particulates) issues. Heat generated by the continuous contact between the head and disk during disk drive operations can also have an adverse effect on the accuracy of the exchange of information between the head and disk (e.g., via thermal transients or asperities). Frictional forces from the contact between the head and disk can also cause data transfer problems in the form of track misregistrations, as well as bit shift or jitter caused by suspension and/or air-bearing resonance excitations.

Another approach which has been utilized in commercial disk drive designs is for the head to fly above the surface of the disk. Typically the head includes a slider with a recording and/or writing element(s) carried thereby. One or more air-bearing surfaces are included on the lower surface of the slider and that project at least generally toward the disk. These air-bearing surfaces are shaped/oriented on the slider body so that the boundary layer of air that is carried by the disk during rotation thereof is compressed and forced to flow underneath the slider. Rotation of the disk in excess of a certain velocity will generate sufficient forces on the air bearing surfaces to lift the slider above the surface of the disk toward which the air-bearing surfaces at least generally project.

Relatively significant development efforts have been directed to the design of the air-bearing surfaces of flying type sliders. The problems that have been addressed by these efforts have not been simply to realize flying of the slider in spaced relation to the disk, but instead to considerations such as attempting to accurately control the fly height or to achieve a consistent fly height. Another area of focus has been to attempt to minimize the spacing between the head and disk during disk drive operations without actually having any significant contact between the slider and the disk, and which may have adverse effects on data transfer operations as well as the operability of the disk drive or components thereof. Reducing the spacing between the head of a flying slider and the corresponding disk is particularly desirable in relation to accommodating higher bit and track densities for the disk.

SUMMARY OF THE INVENTION

A first aspect of the present invention is generally directed to a slider. The slider includes a leading edge, a trailing edge, a bottom, and a transducer. The leading edge and trailing edge are spaced in a first dimension. The bottom includes a first air bearing surface or ABS pad, which in turn includes a first ABS region and a second ABS region that adjoin. The second ABS region is disposed between the first ABS region and the leading edge in the first dimension. Furthermore, the width of the second ABS region, measured orthogonally to the noted first dimension, is less than a width of the first ABS region. The transducer is disposed within the first ABS region of the first ABS pad.

Various refinements exist of the features noted in relation to the first aspect of the present invention. Further features may also be incorporated in the first aspect of the present invention as well. These refinements and additional features may exist individually or in any combination. The slider may be incorporated by any appropriate apparatus, such as a disk drive of any appropriate size, shape, configuration, and/or type. However, the slider is particularly suited for an application where the slider will fly above a corresponding data storage medium during operation of an apparatus that incorporates the slider (e.g., the slider may be maintained in spaced relation to its corresponding data storage medium during normal operations). In this regard, an appropriate medium (e.g., air) may flow relative to the slider in a direction that is at least generally from its leading edge to its trailing edge. Moreover, the slider may be oriented such that its bottom at least generally projects toward or faces the noted data storage medium.

The first ABS pad may extend at least generally from the trailing edge of the slider and toward the leading edge of the slider, but such that the first ABS pad terminates prior to actually reaching the leading edge of the slider. Stated another way, the first ABS pad may be configured so as to not extend the full length of the slider (where the "length" is measured in the noted first dimension). Stated yet another way, the first ABS pad may be located in the trailing half of the slider in relation to the first dimension (e.g., somewhere between the trailing edge and a location that is half-way between the leading and trailing edges). The first ABS pad may be characterized as being centrally disposed relative to a pair of side or side edges of the slider that each extend between the leading and trailing edges of the slider, although other positions in a side-to-side or lateral dimension of the first ABS pad may be appropriate. The first ABS pad may also be characterized as having its lateral midpoint being disposed on a first reference axis that extends in the first dimension and that is disposed half-way between a pair of side or side edges of the slider that each may extend between the leading and trailing edges of the slider. The "lateral midpoint" of the first ABS pad may be characterized as that location that is half-way between a pair of side or side edges of the first ABS pad, where these side edges extend at least generally in the noted first dimension.

The first ABS pad may occupy less than the entirety of the bottom of the slider. Various other ABS pads may be utilized by the bottom of the slider as well. Each ABS pad used by the slider (including the first ABS pad) may be of any appropriate size, shape, and/or configuration, and may be disposed in any appropriate arrangement on the bottom of the slider. Each ABS pad used by the slider also may have an associated pressurizing surface or step of any appropriate size, shape, and/or configuration.

The first ABS pad may include a planar ABS surface that exists in at least part of the first ABS region and the second ABS region. Stated another way, at least a portion of a planar ABS surface associated with the first ABS pad may exist in at least part of each of the first and second ABS regions (e.g., thereby encompassing existing throughout the entirety of each of the first and second ABS regions). In any case, the transducer may be disposed at or coplanar with the ABS surface in the first ABS region, or the "tip" of the transducer could be at least somewhat embedded in the first ABS region of the first ABS pad.

The second ABS region adjoins the first ABS region. Stated another way, the first and second ABS regions share a common boundary. In one embodiment, the second ABS region is disposed immediately in front of the first ABS region, proceeding in the direction of the leading edge of the slider. In another embodiment, the maximum width of the second ABS region is less than the minimum width of the first ABS region.

The first ABS pad may also include what may be referred to as a third ABS region, where the second ABS region is disposed between the first ABS region and the third ABS region in the first dimension (again, the dimension corresponding with the spacing between the leading and trailing edges). The above-noted planar ABS surface may also exist in at least part of the third ABS region, and thereby including existing throughout the entirety of the third ABS region. The width of the second ABS region may be less than the width of at least part of the third ABS region, again where the width is measured in a dimension that is orthogonal to the first dimension.

The second ABS region may adjoin the above-noted third ABS region, or stated another way the second and third ABS regions may share a common boundary. In one embodiment, the third ABS region is disposed immediately in front of the second ABS region, proceeding in the direction of the leading edge of the slider. In another embodiment, the portion of the third ABS region that adjoins the second ABS region is wider than the second ABS region.

A thermal actuator may be disposed in the first ABS region of the first ABS pad, along with the noted transducer. Both the thermal actuator and the transducer may be of any appropriate size, shape, configuration, and/or type (e.g., the transducer may be in the form of a read/write head based upon any appropriate technology or combination of technologies). In one embodiment, the thermal actuator is operated to control or at least have some type of effect on the spacing between the transducer and a data storage medium during operation of an apparatus that incorporates the slider. The inclusion of the second ABS region should desirably reduce the pressure experienced by the first ABS region during operation of an apparatus that incorporates the slider.

A second aspect of the present invention is generally directed to a slider. The slider includes leading and trailing edges, a bottom, and a transducer. The leading and trailing edges are spaced in a first dimension. The bottom includes a first air bearing surface or ABS pad, which in turn includes a necked region that is disposed at an intermediate location of the first ABS pad in the first dimension. The transducer is disposed within the first ABS pad outside of the noted necked region.

Various refinements exist of the features noted in relation to the second aspect of the present invention. Further features may also be incorporated in the second aspect of the present invention as well. These refinements and additional features may exist individually or in any combination. The slider may be incorporated by any appropriate apparatus, such as a disk drive of any appropriate size, shape, configuration, and/or type. However, the slider is particularly suited for an application where the slider will fly above a corresponding data storage medium during operation of an apparatus that incorporates the slider (e.g., the slider may be maintained in spaced relation to its corresponding data storage medium during normal operations). In this regard, an appropriate medium (e.g., air) may flow relative to the slider in a direction that is at least generally from the leading edge of the slider to the trailing edge of the slider. Moreover, the slider may be oriented such that its bottom at least generally projects toward or faces the noted data storage medium.

The first ABS pad may extend at least generally from a trailing edge of the slider and toward a leading edge of the slider, but such that the first ABS pad terminates prior to actually reaching the leading edge of the slider. Stated another way, the first ABS pad may be configured so as to not extend the full length of the slider (where the "length" corresponds with the spacing between the noted leading and trailing edges). Stated yet another way, the first ABS pad may be located in the trailing half of the slider in relation to the first dimension (e.g., somewhere between the trailing edge and a location that is half-way between the leading and trailing edges). The first ABS pad may be characterized as being centrally disposed relative to a pair of side or side edges of the slider that each extend between the leading and trailing edges of the slider, although other positions in a side-to-side or lateral dimension of the first ABS pad may be appropriate. The first ABS pad may also be characterized as having its lateral midpoint being disposed on a first reference axis that extends in the direction that the leading and trailing edges are spaced from each other and that is disposed half-way between a pair of side or side edges of the slider that each may extend between the leading and trailing edges of the slider. The "lateral midpoint" of the first ABS pad may be characterized as that location that is half-way between a pair of side or side edges of the first ABS pad, where these side edges extend at least generally in the direction that the leading and trailing edges are spaced from each other.

The first ABS pad may occupy less than the entirety of the bottom of the slider. Various other ABS pads may be utilized by the bottom of the slider as well. Each ABS pad used by the slider (including the first ABS pad) may be of any appropriate size, shape, and/or configuration, and may be disposed in any appropriate arrangement on the bottom of the slider. Each ABS pad used by the slider also may have an associated pressurizing surface or step of any appropriate size, shape, and/or configuration.

A width of the necked region may extend in a dimension that is orthogonal to a spacing between the leading and trailing edges of the slider. In one embodiment, what may be characterized as a leading edge portion of the first ABS pad that adjoins the necked region in the direction of the leading edge is wider than the necked region, while what may be characterized as a trailing edge portion of the first ABS pad that adjoins the necked region in the direction of the trailing edge is also wider than the necked region. The noted transducer may be disposed in the trailing edge portion of the first ABS pad. Moreover, the slider may also include a separate thermal actuator that is also disposed in the trailing edge portion of the first ABS pad.

A thermal actuator may be disposed in the first ABS pad outside of its necked region (e.g., between the necked region and the trailing edge of the slider). Both the thermal actuator and the transducer may be of any appropriate size, shape, configuration, and/or type (e.g., the transducer may be in the form of a read/write head based upon any appropriate technology or combination of technologies). In one embodiment, the thermal actuator is operated to control or at least have some type of effect on the spacing between the transducer and a data storage medium during operation of an apparatus that incorporates the slider. The necked region of the first ABS pad is preferably positioned so as to desirably reduce the pressure experienced by the portion of the first ABS pad coinciding with the transducer during operation of an apparatus that incorporates the slider.

BRIEF DESCRIPTION OF THE DRAWINGS

FIG. 7B is a side view schematic of one embodiment of a read/write head and a thermal actuator that may be used by the slider of FIG. 7A.

FIG. 7C is one particular configuration for the thermal actuator of FIG. 7B.

FIG. 7D illustrates one embodiment of an operation of the thermal actuator of FIG. 7B.

DETAILED DESCRIPTION

Figure 1:
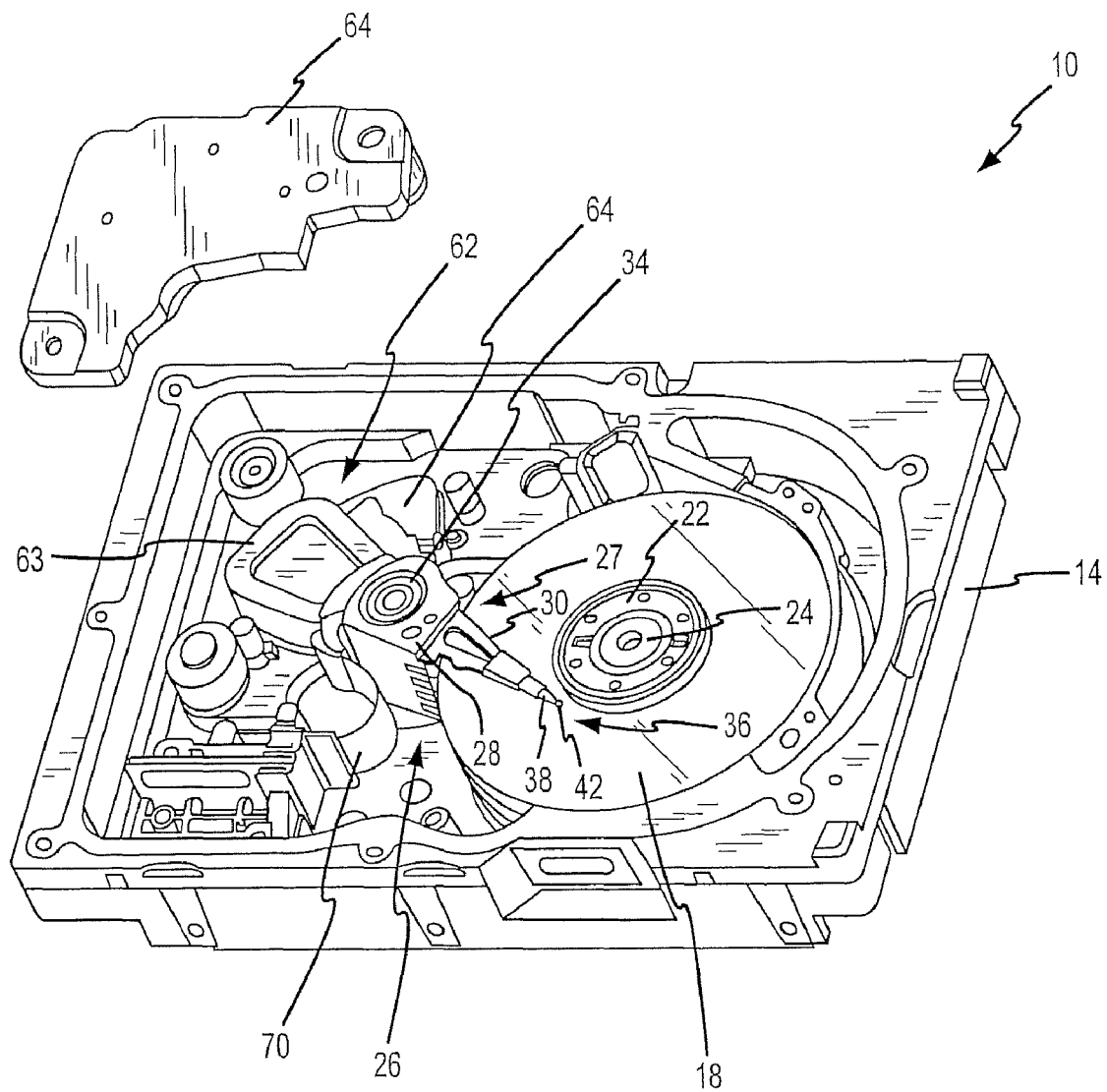
FIG. 1 is a perspective view of a prior art disk drive.
Figure 2:
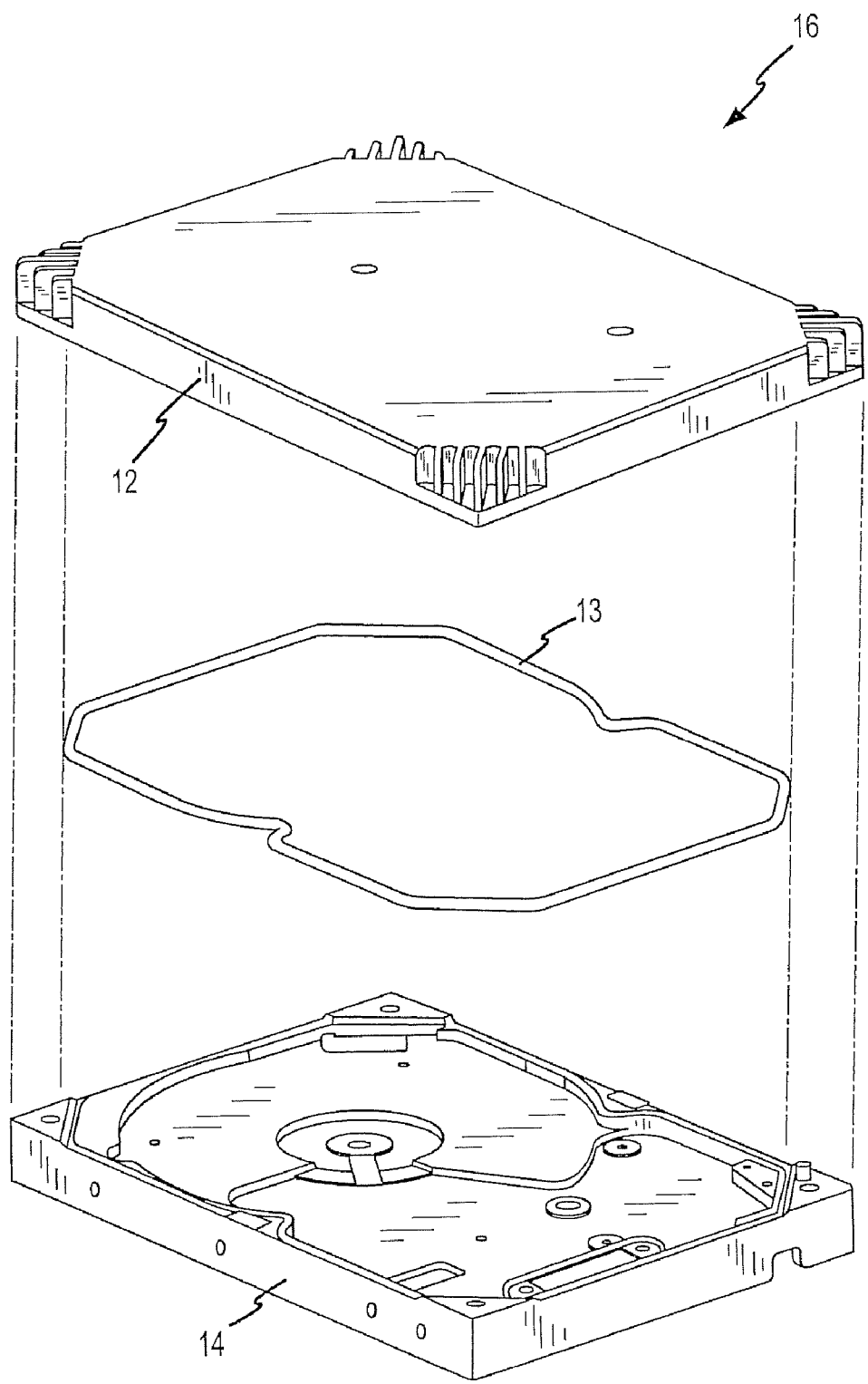
FIG. 2 is an exploded, perspective view of a prior art disk drive housing for the disk drive of FIG. 1.

One embodiment of a prior art disk drive 10 is illustrated in FIGS. 1-4. However, this disk drive 10 may be adapted to incorporate a necked ABS that "leads" (toward a leading edge) the transducer region (e.g., read/write head) and/or thermal actuator region, the combination of which is not known to be in the prior art. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. A spindle motor rotates the hub and attached clamp 22 about a shaft 24 of the spindle motor to simultaneously spin the data storage disk(s) 18 at an appropriate rate.

The disk drive 10 also includes a head positioner assembly 26, that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 are disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator aims that are each mounted on the pivot bearing 34.

Movement of the head positioner assembly 26 is provided by an appropriate head stack assembly drive, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly, ("VCM magnet assembly") 64 that is disposed above and below this coil 63 (the upper VCM magnet assembly 64 being "exploded away" in FIG. 1). The VCM magnet assemblies 64 will typically be mounted on the housing 16 in a fixed position, with the upper VCM magnet assembly 64 being appropriately supported above the lower VCM magnet assembly 64. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head positioner assembly 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the head positioner assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 "across" the corresponding data storage disk 18 to position the head 44 at the desired/required radial position on the disk 18 (i.e., at the correct track on the data storage disk 18) for disk drive read/write operations.

When the disk drive 10 is not in operation, the head positioner assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 may include a ramp assembly that is disposed beyond a perimeter of the data storage disk 18 to typically both move the corresponding slider 42 vertically away from its corresponding data storage disk 18 and to also exert somewhat of a retaining force on the corresponding actuator arm 30. Any configuration for the ramp assembly that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 may include an actuator arm assembly latch that moves from a non-latching position to a latching position to engage an actuator arm 30 so as to preclude the same from pivoting in a direction which would tend to drag the slider(s) 42 across its corresponding data storage disk 18.

Figure 3:
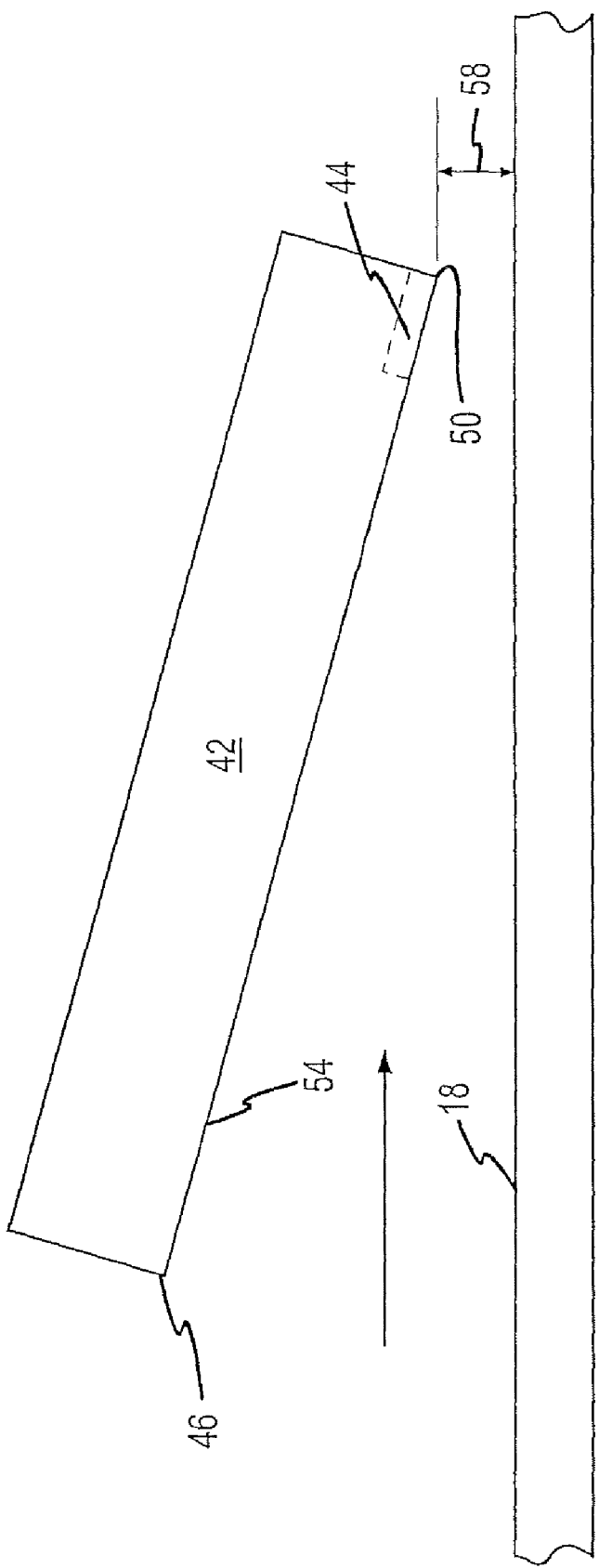
FIG. 3 is a schematic representation of a prior art flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
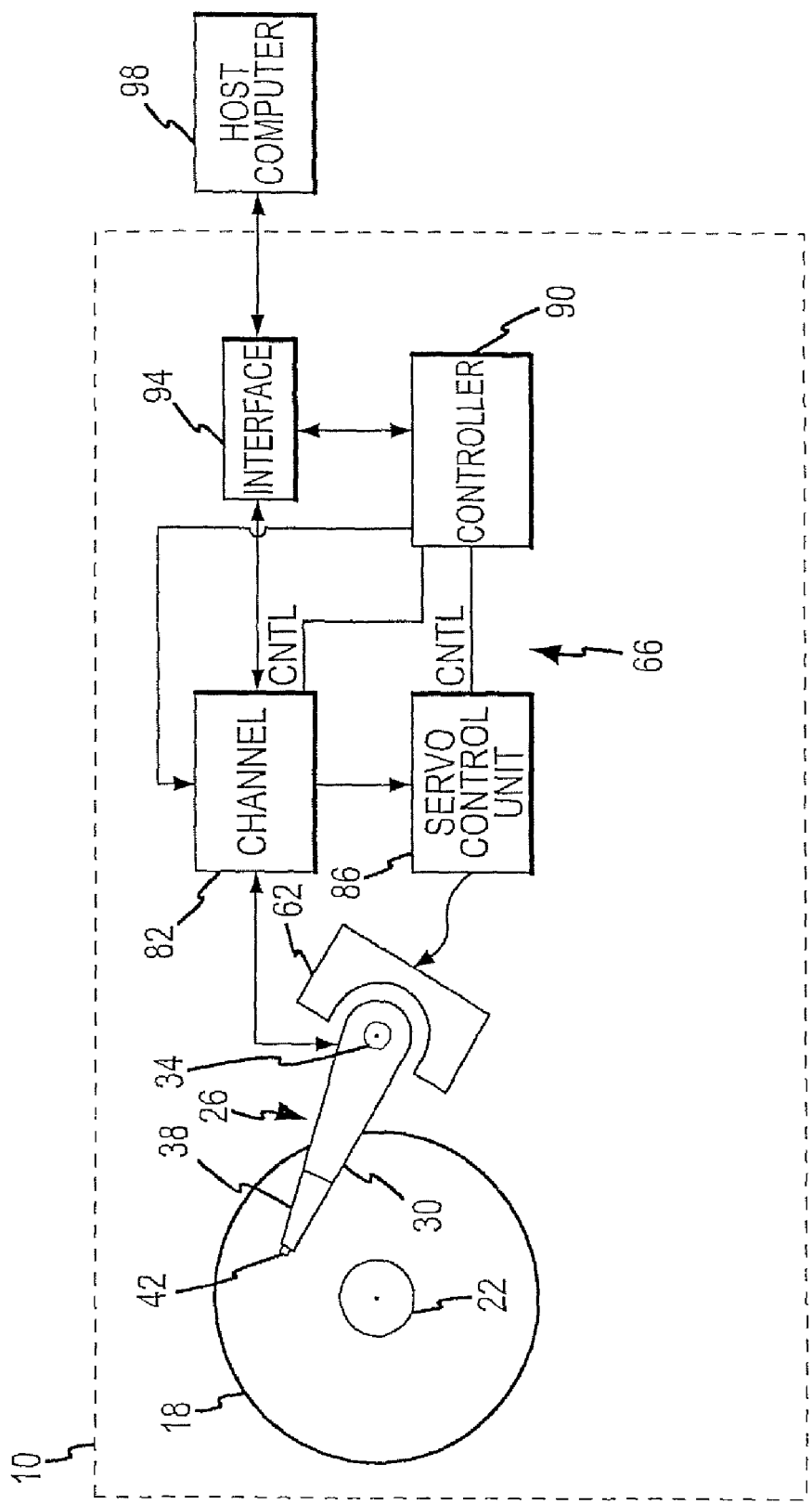
FIG. 4 is a simplified prior art electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

Figure 5A:
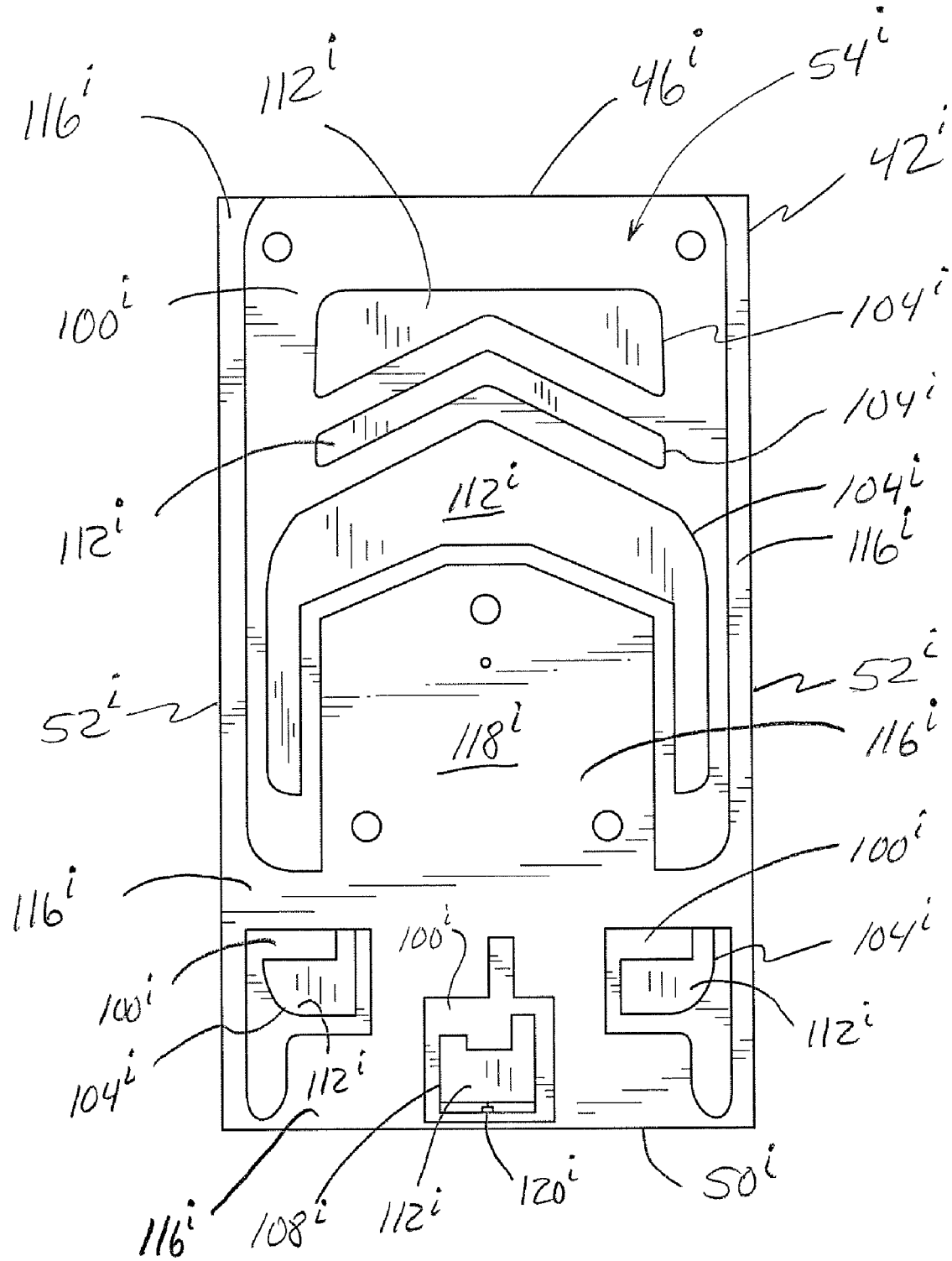
FIG. 5A is a plan view of a lower surface or bottom of a slider that may be used by a disk drive.

FIG. 5A illustrates a slider $42^i$ that may be used by the disk drive 10 of FIG. 1. The slider $42^i$ includes a leading edge $46^i$ and a trailing edge $50^i$ that are spaced from each other in what may be characterized as a longitudinal dimension, as well as a pair of sides or side edges $52^i$ that are spaced from each other in what may be characterized as a lateral dimension. The noted "lateral dimension" is orthogonal to the noted "longitudinal dimension." The slider $42^i$ includes a lower surface or bottom $54^i$ that at least generally faces or projects toward a corresponding data storage medium when the slider $42^i$ is incorporated by a disk drive. The slider $42^i$ is configured to "fly" or be disposed in spaced relation to the corresponding data storage medium during operation of a disk drive that incorporates the slider $42^i$.

The bottom or lower surface $54^i$ of the slider $42^i$ includes a plurality of air bearing surface or ABS pads $104^i$ and an ABS pad $108^i$ that are distributed/shaped to allow the slider $42^i$ to fly in a desired manner during operation of an apparatus that incorporates the slider $42^i$. Each ABS pad $104^i$ includes an air bearing surface $112^i$ on which a fluid acts (e.g., air from a rotating data storage medium, and which progresses at least generally from the leading edge $46^i$ to the trailing edge $50^i$ of the slider $42^i$) to exert a force on the slider $42^i$, where this force disposes the slider $42^i$ in spaced relation to the corresponding data storage medium. A pressurizing surface or step $100^i$ is disposed immediately in front of each of the ABS pads $104^i$ ("in front of" meaning at least generally in the direction of the leading edge $46^i$, or "upstream" in relation to the general direction of the fluid flow along the bottom $54^i$ of the slider $42^i$). Typically: the various air bearing surfaces $112^i$ will be of a planar configuration and coplanar with each other; the various pressurizing surfaces $100^i$ will be of a planar configuration and coplanar with each other; and the air bearing surfaces $112^i$ will be parallel with the pressurizing surfaces $100^i$, but the pressurizing surfaces $100^i$ will be recessed an appropriate distance back or offset from the air bearing surfaces $112^i$ (e.g., if the bottom $54^i$ of the slider $42^i$ is disposed on a flat surface, the air bearing surfaces $112^i$ will engage the flat surface, while the pressurizing surfaces $100^i$ will be spaced from this flat surface).

The bottom surface $54^i$ of the slider $42^i$ also may be characterized as including a base or a base surface $116^i$. Part of the base $116^i$ is in the form of a suction cavity $118^{ii}$, which exerts a force on the slider $42^i$ that biases the slider $42^i$ toward its corresponding data storage medium during operation of an apparatus that incorporates slider $42^i$ (e.g., the lifting forces exerted on the slider $42^i$ via the various air bearing surfaces $112^i$ and the force exerted on the slider $42^i$ via the suction cavity $118^i$ are generally opposite of each other). Typically, the base $116^i$ will be of a planar configuration and parallel with the various pressurizing surfaces $100^i$, but the base $116^i$ will be recessed back an appropriate distance or offset from the pressurizing surfaces $100^i$ (e.g., if the bottom $54^i$ of the slider $42^i$ is disposed on a flat surface, the air bearing surfaces $112^i$ will engage the flat surface, the pressurizing surfaces $100^i$ will be spaced back from this flat surface by a first distance, and the base $116^i$ will be spaced back from this flat surface by a second distance that is greater than the first distance). The amount of offset between the pressurizing surfaces $100^i$ and the base $116^i$ is typically significantly greater than the amount of offset between the pressurizing surfaces $100^i$ and the air bearing surfaces $112^i$.

Figure 5B:
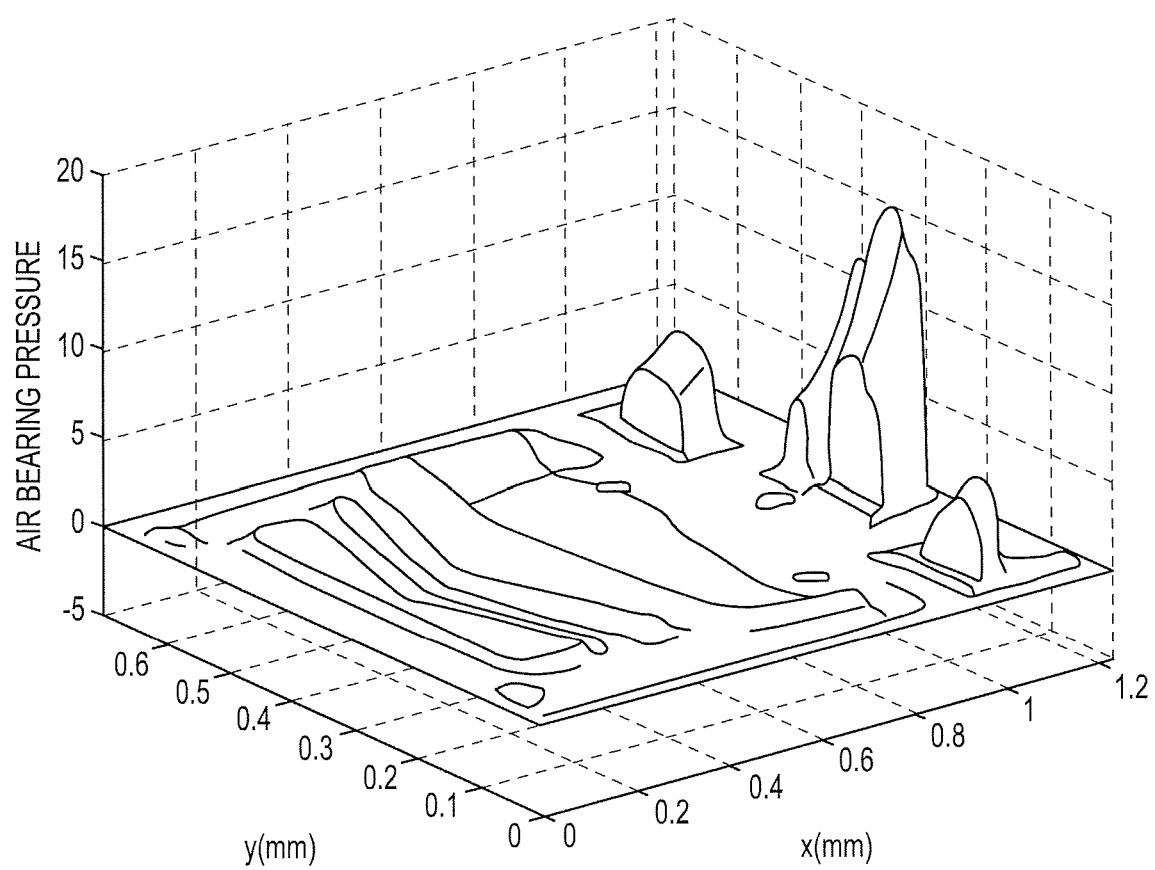
FIG. 5B is a simulated, representative pressure distribution on the lower surface of the slider of FIG. 5A during operation of a disk drive that incorporates this slider.

The bottom surface $54^i$ of the slider $42^i$ includes another ABS pad that is identified by reference numeral $108^i$. This ABS pad $108^i$ also includes an air bearing surface $112^i$ and an associated pressurizing surface $100^i$. An electrical element $120^i$ (e.g., a read/write transducer or head) is disposed within the ABS pad $108^i$ and is able to communicate with the corresponding data storage medium when the slider $42^i$ is incorporated by a disk drive. Based upon the configuration of the ABS pad $108^i$, the pressure exerted on its corresponding ABS surface $112^i$ over or proximate to the electrical element $120^i$ may be rather large and as shown in FIG. 5B.

Figure 6A:
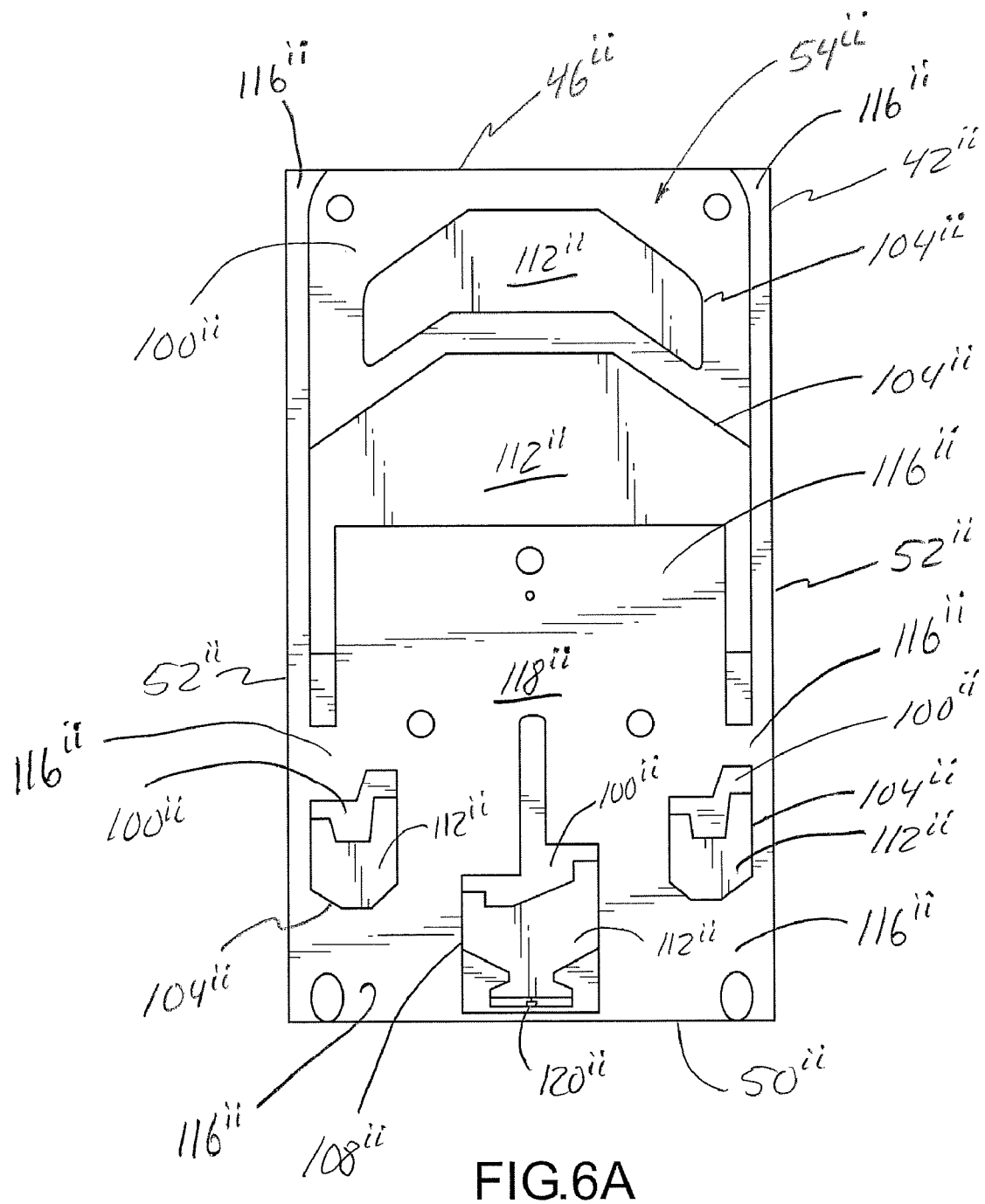
FIG. 6A is a plan view of a lower surface or bottom of a slider that may be used by a disk drive, and that includes a necked region that leads the transducer region to reduce the pressure acting on the transducer region.

FIG. 6A illustrates a slider $42^{ii}$ that may be used by the disk drive 10, any other appropriate disk drive configuration, or any other appropriate apparatus. The slider $42^{ii}$ includes a leading edge $46^{ii}$ and a trailing edge $50^{ii}$ that are spaced from each other in the longitudinal dimension, as well as a pair of sides or side edges $52^{ii}$ that are spaced from each other in the lateral dimension. The slider $42^{ii}$ includes a lower surface or bottom $54^{ii}$ that at least generally faces or projects toward a corresponding data storage medium when the slider $42^{ii}$ is incorporated by an appropriate apparatus (e.g., a disk drive). The slider $42^{ii}$ is configured to "fly" or be disposed in spaced relation to the corresponding data storage medium during operation of the apparatus that incorporates the slider $42^{ii}$.

The bottom or lower surface $54^{ii}$ of the slider $42^{ii}$ includes a plurality of air bearing surface or ABS pads $104^{ii}$ and an ABS pad $108^{ii}$ that are distributed/shaped to allow the slider $42^{ii}$ to fly in a desired manner during operation of an apparatus that incorporates slider $42^{ii}$". Each ABS pad $104^{ii}$ includes an air bearing surface $112^{ii}$ on which a fluid acts (e.g., air from a rotating data storage medium, and which progresses at least generally from the leading edge $46^{ii}$ to the trailing edge $50^{ii}$ of the slider $42^{ii}$) to exert a force on the slider $42^{ii}$, where this force disposes the slider $42^{ii}$ in spaced relation to the corresponding data storage medium. A pressurizing surface or step $100^{ii}$ is disposed immediately in front of each of the ABS pads $104^{ii}$ ("in front of" meaning at least generally in the direction of the leading edge $46^{ii}$, or "upstream" in relation to the general direction of the fluid flow along the bottom $54^{ii}$ of the slider $42^{ii}$). Typically: the various air bearing surfaces $112^{ii}$ will be of a planar configuration and coplanar with each other; the various pressurizing surfaces $100^{ii}$ will be of a planar configuration and coplanar with each other; and the air bearing surfaces $112^{ii}$ will be parallel with the pressurizing surfaces $100^{ii}$, but the pressurizing surfaces $100^{ii}$ will be recessed back an appropriate distance or offset from the air bearing surfaces $112^{ii}$ (e.g., if the bottom $54^{ii}$ of the slider $42^{ii}$ is disposed on a flat surface, the air bearing surfaces $112^{ii}$ will engage the flat surface, while the pressurizing surfaces $100^{ii}$ will be spaced from this flat surface). In one embodiment, the air bearing surfaces $112^{ii}$ are offset from the pressurizing surfaces $100^{ii}$ by a distance within a range of about 100 nanometers to about 150 nanometers, although other offset values may be appropriate.

The bottom surface $54^{ii}$ of the slider $42^{ii}$ also may be characterized as including a base or a base surface $116^{ii}$. Part of the base $116^{ii}$ is in the form of a suction cavity $118^{ii}$, which exerts a force on the slider $42^{ii}$ that biases the slider $42^{ii}$ toward its corresponding data storage medium during operation of an apparatus that incorporates the slider $42^{ii}$ (e.g., the lifting forces exerted on the slider $42^{ii}$ via the various air bearing surfaces $112^{ii}$ and the force exerted on the slider $42^{ii}$ via the suction cavity $118^{ii}$ are generally opposite of each other). Typically, the base $116^{ii}$ will be of a planar configuration and parallel with the various pressurizing surfaces $100^{ii}$, but the base $116^{ii}$ will be recessed back an appropriate distance or offset from the pressurizing surfaces $100^{ii}$ (e.g., if the bottom $54^{ii}$ of the slider $42^{ii}$ is disposed on a flat surface, the air bearing surfaces $112^{ii}$ will engage the flat surface, the pressurizing surfaces $100^{ii}$ will be spaced back from this flat surface by a first distance, and the base $116^{ii}$ will be spaced back from this flat surface by a second distance that is greater than the first distance). In one embodiment, the base $116^{ii}$ is offset from the air bearing surfaces $112^{ii}$ by a distance within a range of about 1,800 nanometers to about 2,000 nanometers, although other offset values may be appropriate. Typically, the amount of offset between the pressurizing surfaces $100^{ii}$ and the base $116^{ii}$ is significantly greater than the amount of offset between the pressurizing surfaces $100^{ii}$ and the air bearing surfaces $112^{ii}$.

The bottom surface $54^{ii}$ of the slider $42^{ii}$ includes another ABS pad that is identified by reference numeral $108^{ii}$ and that is disposed at or near the trailing edge $50^{ii}$ of the slider $42^{ii}$. The ABS pad $108^{ii}$ may be characterized as being disposed in the trailing half of the slider $42^{ii}$, or that region extending from the trailing edge $50^{ii}$ to a location that is half-way between the leading edge $46^{ii}$ and the trailing edge $50^{ii}$. This ABS pad $108^{ii}$ also includes an air bearing surface $112^{ii}$ and an associated pressurizing surface $100^{ii}$. At least one electrical element $120^{ii}$ (e.g., a read/write transducer or head, a thermal actuator, or both) is disposed within the ABS pad $108^{ii}$. Based upon the configuration of the ABS pad $108^{ii}$, the pressure exerted on its corresponding ABS surface $112^{ii}$ over or proximate to the electrical element(s) $120^{ii}$ is reduced (FIG. 6B) compared to the above-noted ABS pad $108^{i}$ (FIG. 5B).

Figure 6B:
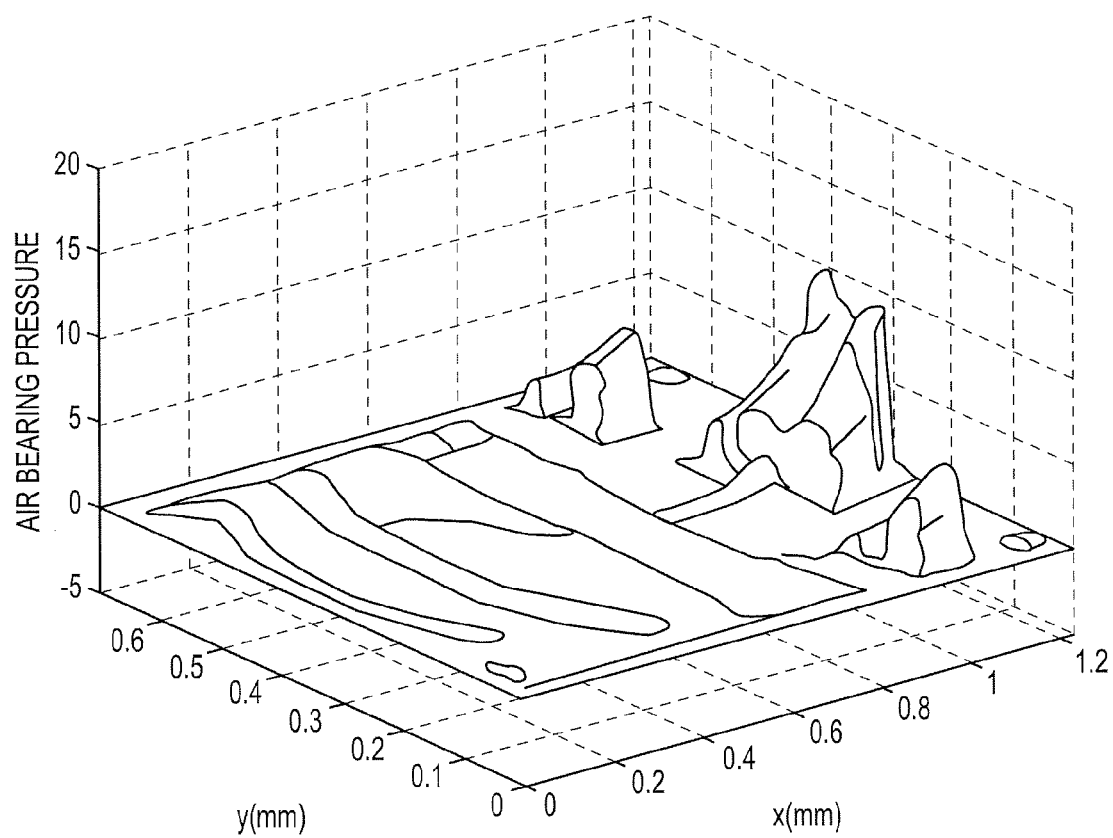
FIG. 6B is a simulated, representative pressure distribution on the lower surface of the slider of FIG. 6A during operation of a disk drive that incorporates this slider.
Figure 6C:
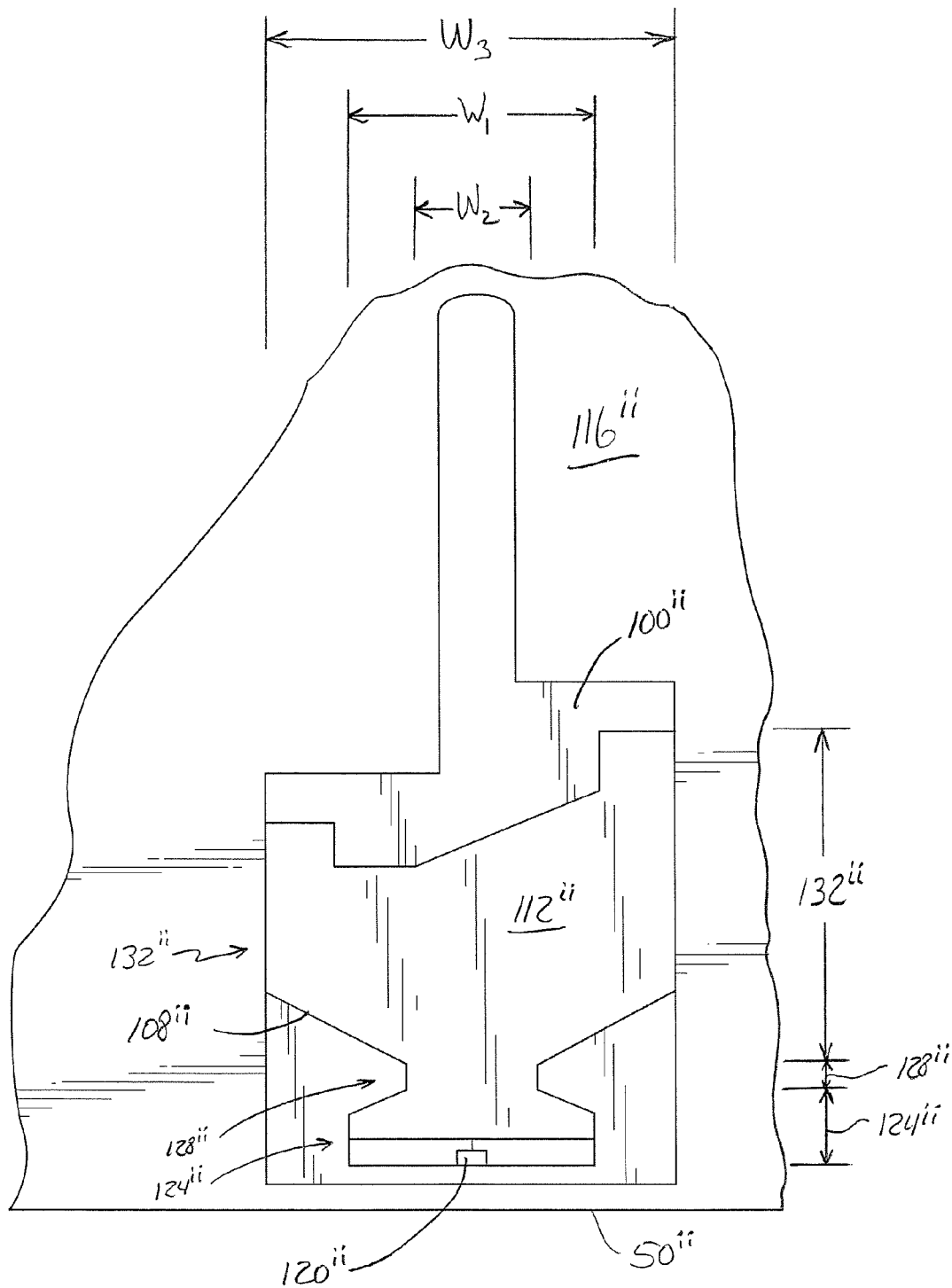
FIG. 6C is an enlarged view of the ABS pad that includes the necked region for leading the transducer region.

FIG. 6C provides an enlarged view of the ABS pad $108^{ii}$. Generally, the ABS pad $108^{ii}$ is necked in the plan view of FIGS. 6A and 6C, which reduces the pressure on the portion of the ABS pad $108^{ii}$ corresponding with the electrical element(s) $120^{ii}$ and which is beneficial in a manner that will be discussed in more detail below. As a result of its necked configuration, the ABS pad $108^{ii}$ may be characterized as having three distinct regions—a first ABS region $124^{ii}$ disposed at or near the trailing edge $50^{ii}$ (the line in FIG. 6C illustrates that part of the first ABS region $124^{ii}$ may be formed from one material, and that the remainder of the first ABS region 120 (which includes the electrical element(s) $120^{ii}$) may be formed from another material), a second ABS region $128^{ii}$ that is disposed immediately in front of (in the direction of the leading edge $46^{ii}$) and adjoins the first ABS region $124^{ii}$, and a third ABS region $132^{ii}$ that is disposed immediately in front of (in the direction of the leading edge $46^{ii}$) and adjoins the second ABS region $128^{ii}$. The portion of the third ABS region $132^{ii}$ (a leading edge portion of the ABS pad $108^{ii}$) that adjoins the second ABS region $128^{ii}$ is wider than the second ABS region $128^{ii}$ (a necked region). Similarly, the portion of the first ABS region $124^{ii}$ (a trailing edge portion of the ABS pad $108^{ii}$) that adjoins the second ABS region $128^{ii}$ similarly is wider than the second ABS region $128^{ii}$. Although the third ABS region $132^{ii}$ is illustrated as being wider than the first ABS region $124^{ii}$, such may not be required in all instances. In any case, at least one electrical element $120^{ii}$ used by the slider $42^{ii}$ may be characterized as being disposed outside of the second ABS region $128^{ii}$. Each electrical element $120^{ii}$ used by the slider $42^{ii}$ may also be characterized as being disposed in the first ABS region $124^{ii}$.

A width dimension may correspond with the direction in which the side edges $52^{ii}$ of the slider $42^{ii}$ are spaced from each other (i.e., the width dimension coincides with the above-noted lateral dimension). The width of the second ABS region $128^{ii}$ ($W_2$ in FIG. 6C) is less than the width of at least the first ABS region $124^{ii}$ ($W_1$ in FIG. 6C). In one embodiment the maximum width of the second ABS region $128^{ii}$ is less than a minimum width of the first ABS region $124^{ii}$. In another embodiment, the width of the entirety of the second ABS region $128^{ii}$ is less than a width of the entirety of the first ABS region $124^{ii}$. Moreover and in the illustrated embodiment, the width of the second ABS region $128^{ii}$ ($W_2$ in FIG. 6C) is also less than the width of the third ABS region $132^{ii}$ ($W_3$ in FIG. 6C). Having the width of the second ABS region $128^{ii}$ ($W_2$ in FIG. 6C) be less than the width of at least the first ABS region $124^{ii}$ ($W_1$ in FIG. 6C) reduces the pressure exerted on the first ABS region $124^{ii}$.

Further characterizations may be made in relation to the ABS pad $108^{ii}$. The maximum width of the second ABS region $128^{ii}$ may be less than the maximum width of the first ABS region $124^{ii}$, may be less than the maximum width of the third ABS region $132^{ii}$, or both. The ABS pad $108^{ii}$ may also be characterized as having a pair of opposing notches that define the second ABS region $128^{ii}$. In one embodiment, the second ABS region $128^{ii}$ is centrally disposed relative to the first ABS region $124^{ii}$. In another embodiment, each of the first ABS region $124^{ii}$ and the second ABS region $128^{ii}$ are symmetrically disposed relative to a reference axis that extends between the leading edge $46^{ii}$ and the trailing edge $50^{ii}$, and further that bisects the slider $42^{ii}$ in the lateral dimension.

Consider the case where the noted at least one electrical element $120^{ii}$ in the first ABS region $124^{ii}$ of the ABS pad $108^{ii}$ of the slider $42^{ii}$ (FIGS. 6A and 6C) includes both a transducer for communicating with a data storage medium (e.g., a read/write transducer or head), as well as a separate thermal actuator for controlling in at least some sense the position or spacing of the transducer relative to the corresponding data storage medium. This will be discussed in more detail below in relation to FIGS. 7A-D. An electrical signal may be directed to the thermal actuator in an attempt to at least somewhat distort the first ABS region $124^{ii}$ of the ABS pad $108^{ii}$ (which contains the read/write transducer or head) for purposes of reducing the spacing between the read/write transducer and the corresponding data storage medium. In the case of the slider $42^{ii}$, providing a signal to the thermal actuator causes the portion of the ABS pad $108^{ii}$ coinciding with the read/write transducer and the thermal actuator (the first ABS region $124^{ii}$) to protrude/distort and provide a first spacing between the read/write transducer and the corresponding data storage medium. If this same thermal actuator is used by the slider $42^{i}$ of FIG. 5A and if this same signal is provided to the thermal actuator, this signal again will cause the portion of the ABS pad $108^{ii}$ coinciding with the read/write transducer and the thermal actuator to protrude/distort, but in the case of the slider $42^{i}$ the thermal actuator will provide a spacing between the read/write transducer and the corresponding data storage medium that is larger than the corresponding spacing noted in relation to the slider $42^{ii}$. This is believed to be due to the pressure differences on the portion of the slider coinciding with the read/write transducer or head in these two cases.

There are a number of theories as to why having a lower pressure on a portion of an ABS pad coinciding with a read/write transducer and a thermal actuator is believed to reduce the spacing between the read/write transducer and the corresponding data storage medium for a given actuation of the thermal actuator (the case of the slider $42^{ii}$ of FIGS. 6A-C, versus the slider $42^{i}$ of FIGS. 5A-B). One is that a lower pressure acting on this portion of the ABS pad has less of a cooling effect on the ABS pad, and thereby allows the ABS pad to protrude further for a given actuation signal to the thermal actuator (via expansion from heat generated by actuation of the thermal actuator). That is, the first ABS region $124^{ii}$ of the ABS pad $108^{ii}$ may be at a higher temperature (because it is at a lower pressure, and then cooled to a lesser extent) than the region of the ABS pad $108^{i}$ that includes a transducer and thermal actuator (because it is at a higher pressure, and thereby cooled to a greater extent) during actuation of the thermal actuator. Therefore, imparting the same energy to the first ABS region $124^{ii}$ of the ABS pad $108^{ii}$ and the region of the ABS pad $108^{i}$ having a transducer and thermal actuator will distort the first ABS region $124^{ii}$ of the ABS pad $108^{ii}$ more than the region of the ABS pad $108^{i}$ having a transducer and thermal actuator. Another is that expansion or protrusion of a portion of an ABS pad coinciding with a read/write transducer and a thermal actuator in a higher pressure situation (e.g., the region of the slider $42^{i}$ of FIGS. 5A-5B having a transducer and thermal actuator, compared to first ABS region $124^{ii}$ of the slider $42^{ii}$ of FIGS. 6A-C) may focus the lifting forces exerted on the slider such that the spacing between the read/write transducer and the corresponding data storage medium is not reduced to the desired degree. In any case and as noted, if both the slider $42^{i}$ of FIG. 5A and the slider $42^{ii}$ of FIG. 6A incorporate the same read/write transducer and the same thermal actuator, where each thermal actuator receives the same electrical signal, and where the sliders $42^{i}$ and $42^{ii}$ are incorporated into a disk drive and operated in the same manner, the read/write transducer of the slider $42^{ii}$ should be spaced closer to the data storage medium than the read/write transducer of the slider $42^{i}$ (e.g., actuation of the thermal actuator will produce a larger effect in the case of the slider $42^{ii}$ of FIG. 6A than in the case of the slider $42^i$ of FIG. 5A, and which is believed to be due to the first ABS region $124^{ii}$ of FIG. 6A being at a lower pressure than the region of the slider $42^i$ coinciding with the transducer and the thermal actuator of FIG. 5A).

Figure 7A:
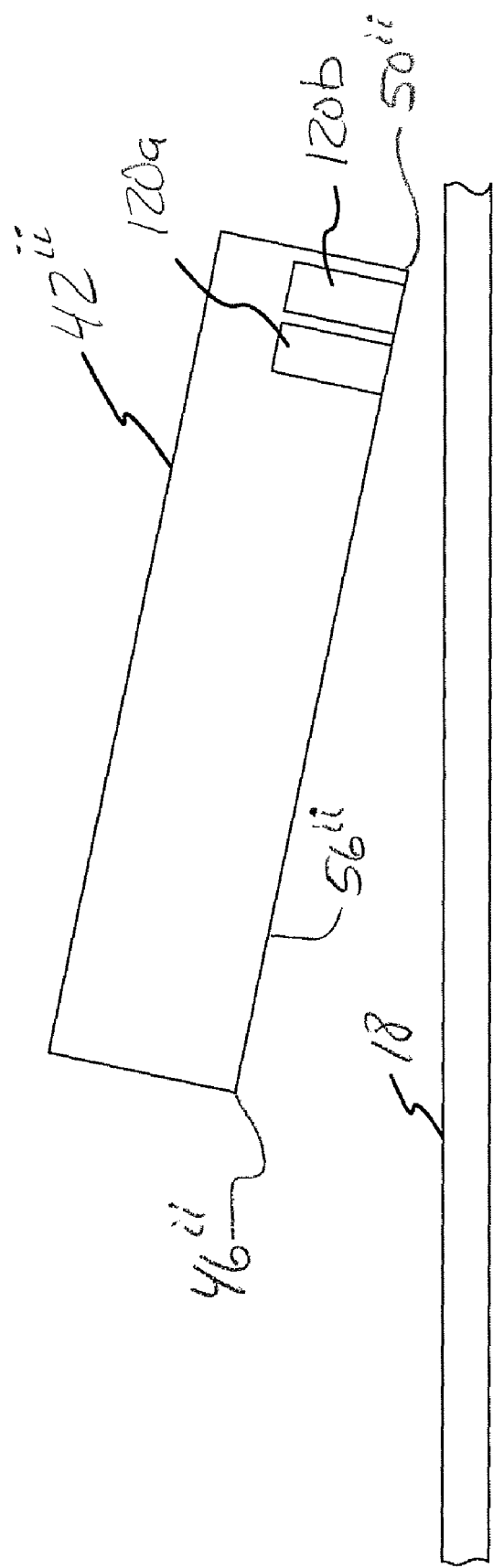
FIG. 7A is a representative position (side view) of one configuration of the slider of FIG. 6A during operation and in relation to a data storage medium.

FIG. 7A is a block diagram of the slider $42^{ii}$ of FIG. 6A, and that incorporates both a transducer 120a (e.g., a read/write head; giant magnetoresistive) and a thermal actuator 120b, each of which may be in any appropriate size, shape, configuration, and/or type. Both the transducer 120a and the thermal actuator 120b are disposed within the first ABS region $124^{ii}$ of the slider $42^{ii}$. The transducer 120a and thermal actuator 120b are separate structures—that is, the thermal actuator 120b is not part of the transducer 120a and vice versa. For instance, the transducer 120a and the thermal actuator 120b may be spaced from each other as shown in FIG. 7A. The transducer 120a and thermal actuator 120b also are preferably electrically isolated from one another to prevent electrical conduction therebetween (e.g., so that an electrical signal provided to the thermal actuator 120b is not transmitted to the transducer 120a, and vice versa). Although the thermal actuator 120b is illustrated in FIG. 7A as being disposed closer to the trailing edge $50^{ii}$ than the transducer 120a, such need not be the case. What is of importance is that each of the transducer 120a and thermal actuator 120b are at least partially disposed in the first ABS region $124^{ii}$.

The thermal actuator 120b may be of any appropriate configuration that is able to provide for what is commonly referred to as fly height adjustment, or to vary/control the position of the transducer 120a relative to the data storage disk 18 (e.g., to control the spacing between the transducer 120a and its corresponding data storage medium, such as the data storage disk 18). Representative fly height control heater or thermal actuator configurations that may be appropriate for the thermal actuator 120b of FIG. 7A are disclosed in U.S. patent application Ser. No. 10/859,917, that is entitled "THERMAL ACTUATOR DESIGN FOR HARD DISK DRIVE MAGNETIC RECORDING," that was filed on Jun. 3, 2004, and the entire disclosure of which is incorporated by reference in its entirety herein. FIGS. 7B-D illustrate one embodiment of a slider 332 that incorporates one embodiment of a fly height adjust or adjustment heater 364, and that may be used in place of the thermal actuator 120b of FIG. 7A. That is, the thermal actuator 120b of FIG. 7A may be in the form of the thermal actuator 364 of FIGS. 7B-D, and thereby may provide a fly height adjustment function in the manner to be described herein.

In the case of FIGS. 7B-D, the illustrated portions of the read transducer and write transducer that are carried by the slider 332 are a read shield 360 and a write shield/pole structure 362. A thermal actuator or heater 364 is also located in the slider 332 adjacent to the write shield/pole structure 362 and displaced above an air-bearing surface 366 of the slider 332. This heater 364 may be used to adjust the fly height of the slider 332 in a manner that will be discussed in more detail below.

The heater 364 may be a coil structure of a conductive material such as $Ni_{80}Fe_{20}$ (permalloy), $Cu_{60}Ni_{40}$ (constantan), $Cu_{88}Sn_{12}$ (bronze), and $Cu_{97.5}Mn_{3.5}$. The two primary considerations in choosing a material are first its resistivity, which together with the length and cross-section determines the resistance of the structure, and which also impacts the resistance of the leads, and second its thermal coefficient of resistance (see below). One example of a possible coil structure for the thermal actuator 364 is shown in FIG. 7C. The coil structure shown in FIG. 7C is a serpentine path of conductive metal film. Other suitable coil shapes could also be employed. Instead of a coil, the thermal actuator 364 could also take some other suitable shape, such as a film heater or a resistive film heater. This arrangement may be preferable in applications where it is desired to use a conductor of relatively higher resistivity. It has also been determined that sharp corners in coils and other shapes may not be desirable as the small radius of curvature can result in high current densities.

The thickness of the conductor and its electrical resistivity are chosen to provide the greatest power dissipation given constraints on current and voltage supply. A thin, sputtered film of high resistivity material (e.g., greater than 3 $\mu\Omega$·cm) may be used for manufacturability and tolerance control reasons. In particular, the coil structure shown in FIG. 7C should be relatively easily produced with this type of high resistivity material. It may be desirable to use low TCR (temperature coefficient of resistance) material for the conductor of the heater coil so that the resistance of the coil does not vary too much with temperature or operating power, so that maximum heat dissipation can be achieved by the thermal actuator 364 (under given voltage and current constraints). One such low-TCR material that has been tested is $Cu_{60}Ni_{40}$.

The geometry of FIG. 7C may include a wire cross-section of 1.5 $\mu$m by 1.5 $\mu$m. The wire length may be 2600 $\mu$m. The wire spacing may be 0.6 $\mu$m. The wire material may be Ni—Fe. The wire resistivity may be 21 $\mu\Omega$·cm. The wire resistance may be 242$\Omega$. The heater DC current may be 20 mA for fly height adjustment operations. The heater voltage may be 4.8 V. The height of the coil may be 86 $\mu$m. The width of the coil may be 31.2 $\mu$m.

The total resistance (R) of the thermal actuator 364 is optimally the resistance that dissipates the greatest amount of heat using the greatest electrical current the system can deliver. This maximum electrical current can be denoted as $I_{max}$. The dissipated heat can be described by the expression $I_{max}^2 R$. The largest resistance that allows the current $I_{max}$ to flow is given by $R=V/I_{max}$ where V is the system voltage. For example, a disk drive system with a system voltage of 5v and a maximum current of 20 mA would require an optimum heater resistance of 250$\Omega$, and would theoretically generate 100 milliwatts. Alternatively, one may choose a smaller heater resistance to allow a transient high power boost greater than the target steady-state power, thus reducing the time to reach the target actuation. DC current or sufficiently low frequency AC current could be used.

Current to the thermal actuator 364 is provided by either a preamplifier chip (not shown), which also provides power to the read and write transducers, or by separate power control circuitry. Current may be delivered via an electrical connector pad at the trailing end of the slider 332, such as is typically used to deliver current to the write transducer.

The return path for current (the ground path) may also be provided by a connector pad at the slider trailing end, as is conventionally provided for the write transducer. Alternatively, the thermal actuator 364 may be grounded to the suspension via a path within the slider body or on its surface.

As can be seen in FIG. 7D, when the thermal actuator 364 is actuated, the portion 376 of the slider 332 in the vicinity thereof (including the portion containing the read/write transducers 360 and 362—the first ABS region $124^{ii}$ in the case of the slider 42ii of FIGS. 6A-C) expands due to the heat produced by actuating the thermal actuator 364. This expansion causes the ABS 366 in the vicinity of the thermal actuator 364 to distort in at least somewhat of a controlled manner so as to be closer to the surface of the disk 314. In this manner, the minimum fly height and the gap fly height can be controlled and made small when desired. At other times, the minimum fly height and the gap fly height can be left at a greater stand off distance to reduce the likelihood of contact with the disk 314. It has been determined that the time constant for actuation is in the range of 1 millisecond. This means that the ABS 366 should have moved 90% of its full travel within approximately 3 milliseconds following a step change in power. Using a form of power delivery commonly called "boost," the expansion can be accelerated by over-adjusting power toward the desired target for the initial phase of actuation (e.g. one time constant). It appears that the time constant for the change in actuation due to a step function application or removal of power is roughly the same for cooling as the time constant for heating.

Once the transducers are positioned closer to the disk surface by this actuation, the disk drive system is capable of higher (frequency) performance reading and writing. It should be emphasized, however, that even in the non-actuated or retracted position, the read transducer could still be utilized to read the relatively-lower frequency servo pattern.

In conclusion, the slider $42^{ii}$ of FIGS. 6A-C includes a necked region (second ABS region $128^{ii}$) in an ABS pad (ABS pad $108^{ii}$) that is disposed immediately in front of a transducer region (first ABS region $124^{ii}$) of this same ABS pad (ABS pad $108^{ii}$). This reduces the pressure on the transducer region (first ABS region $124^{ii}$) of this ABS pad (ABS pad $108^{ii}$). This is believed to be particularly beneficial when the transducer region (first ABS region $124^{ii}$) of this now lower pressure ABS pad (ABS pad $108^{ii}$) includes not only a transducer (transducer 120a), but a thermal actuator (thermal actuator 120b) as well for controlling the position of the transducer (transducer 120a) relative to its corresponding data storage medium.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A slider, comprising:
a leading edge and a trailing edge that are spaced in a first dimension;
a bottom comprising a first air bearing surface (ABS) pad located entirely on a trailing edge side of the bottom, said first ABS pad comprising first, second, and third ABS regions, said first ABS region adjoined to said second ABS region at a common boundary of said first and said second ABS regions, said second ABS region adjoined to said third ABS region at a common boundary of said second and said third ABS regions, said second ABS region being disposed between said first ABS region and said leading edge in said first dimension, said third ABS region being disposed between said second ABS region and said leading edge in said first dimension, each of said first, said second, and said third ABS regions having an air bearing surface, said air bearing surfaces of said first, said second, and said third ABS regions being coplanar with each other, wherein a width dimension is measured orthogonally to said first dimension, said second ABS region air bearing surface having a width that is less than or equal to half of a width of said first ABS region air bearing surface, said third ABS region air bearing surface having a width that is greater than said width of said first ABS region air bearing surface; and
a transducer disposed within said first ABS region of said first ABS pad.

2. An apparatus comprising the slider of claim 1 and a data storage medium, wherein said bottom of said slider at least generally projects toward said data storage medium, wherein said slider is spaced from said data storage medium during operation of said apparatus, and wherein said slider further comprises a pressurizing surface immediately adjacent to the ABS pad and located between the ABS pad and said leading edge, said pressurizing surface being recessed from the air bearing surfaces in a direction opposite from said data storage medium.

3. The slider of claim 1, wherein said second ABS region is centrally disposed relative to said first and said third ABS regions in said width dimension.

4. The slider of claim 1, wherein said width of the entirety of said second ABS region air bearing surface is less than said width of the entirety of said first ABS region air bearing surface and also less than said width of the entirety of said third ABS region air bearing surface.

5. The slider of claim 1, wherein a maximum said width of said second ABS region air bearing surface is less than minimum said widths of said first and said third ABS region air bearing surfaces.

6. The slider of claim 1, wherein said first, said second, and said third ABS region air bearing surfaces form a solid planar region with no recessed cavities.

7. The slider of claim 6, wherein said second ABS region defines a neck of said first ABS pad in plan view.

8. The slider of claim 1, wherein said third ABS region is disposed immediately in front of said second ABS region in a direction of said leading edge.

9. The slider of claim 1, further comprising a thermal actuator disposed within said first ABS region.

10. The slider of claim 1, wherein each of said first, said second, and said third ABS regions has first and second side edges that are at least approximately orthogonal to said leading and said trailing edges.

11. The slider of claim 10, wherein each of said first and said third ABS regions has a pair of tapered edges that adjoins to said second ABS region.

12. The slider of claim 1, wherein a pressure at the transducer is less than 10 atm.

13. The slider of claim 1, wherein each of the first ABS region and the third ABS region has a length in the first dimension that is greater than a length in the first dimension of the second ABS region.

14. The slider of claim 1, wherein the width of the first ABS region is about 120 micrometers and the width of the second ABS region is about 60 micrometers.

15. A slider, comprising:
a leading edge and a trailing edge that are spaced in a first dimension;
a bottom comprising a first air bearing surface (ABS) pad located entirely on a trailing edge side of the bottom, wherein said first ABS pad comprises a necked region disposed at an intermediate location of said first ABS pad in said first dimension;

a transducer disposed within said first ABS pad outside of said necked region, wherein the first ABS pad comprises a leading edge portion comprising a solid planar region with no recessed cavities in a width dimension orthogonal to the first dimension located on a leading edge side of the necked region, wherein the leading edge portion is wider than said necked region, wherein a trailing edge portion of the first ABS pad that adjoins said necked region is wider than the necked region in the width direction, and wherein the leading edge portion is wider than the trailing edge portion in the width direction; and a thermal actuator disposed within said first ABS pad outside of said necked region, said thermal actuator being located between said necked region and said trailing edge.

16. The slider of claim 15, wherein said transducer is disposed in said trailing edge portion of said first ABS pad.

17. The slider of claim 16, wherein said thermal actuator is disposed in said trailing edge portion of said first ABS pad.

* * * * *